(12) United States Patent
Rankin et al.

(10) Patent No.: US 8,649,498 B1
(45) Date of Patent: Feb. 11, 2014

(54) NETWORK ARCHITECTURE FOR HOSTING VOICE SERVICES

(75) Inventors: Mark Rankin, Suffolk (GB); Owen A. Bridle, Berkshire (GB)

(73) Assignee: Cisco Technology, Inc., San Jose, CA (US)

( * ) Notice: Subject to any disclaimer, the term of this patent is extended or adjusted under 35 U.S.C. 154(b) by 1600 days.

(21) Appl. No.: 11/186,643

(22) Filed: Jul. 20, 2005

Related U.S. Application Data (60) Provisional application No. 60/665,523, filed on Mar. 25, 2005.

(51) Int. Cl.
*H04M 3/50* (2006.01)
*H04M 3/51* (2006.01)
*H04M 3/42* (2006.01)

(52) U.S. Cl.
USPC .. 379/221.14; 379/219; 379/289; 379/220.01

(58) Field of Classification Search
USPC .......................................................... 370/356
See application file for complete search history.

(56) References Cited

U.S. PATENT DOCUMENTS

| | | | | |
|---|---|---|---|---|
| 6,335,927 | B1 * | 1/2002 | Elliott et al. | 370/352 |
| 6,426,955 | B1 * | 7/2002 | Gossett Dalton et al. | 370/401 |
| 6,426,995 | B1 * | 7/2002 | Kim et al. | 378/98.3 |
| 6,611,590 | B1 * | 8/2003 | Lu et al. | 379/265.09 |
| 6,614,781 | B1 * | 9/2003 | Elliott et al. | 370/352 |
| 6,674,852 | B1 * | 1/2004 | Hamilton | 379/221.14 |
| 6,775,269 | B1 * | 8/2004 | Kaczmarczyk et al. | 370/352 |
| 6,963,556 | B1 * | 11/2005 | Goldman et al. | 370/352 |
| 7,466,810 | B1 * | 12/2008 | Quon et al. | 379/201.01 |
| 2002/0055975 | A1 * | 5/2002 | Petrovykh | 709/205 |
| 2002/0067739 | A1 * | 6/2002 | Wilkes et al. | 370/465 |
| 2002/0122547 | A1 * | 9/2002 | Hinchey et al. | 379/221.01 |
| 2003/0031192 | A1 * | 2/2003 | Furuno | 370/409 |
| 2003/0128691 | A1 * | 7/2003 | Bergman et al. | 370/352 |
| 2004/0032844 | A1 * | 2/2004 | Lewis et al. | 370/338 |
| 2004/0160946 | A1 * | 8/2004 | Fowler | 370/352 |
| 2004/0252822 | A1 * | 12/2004 | Statham et al. | 379/265.02 |
| 2006/0280192 | A1 * | 12/2006 | Desanti | 370/409 |
| 2008/0008105 | A1 * | 1/2008 | Black et al. | 370/260 |

OTHER PUBLICATIONS

M. Foster, T. McGarry, J. Yu, The Internet Society, "Number Portability in the Global Switched Telephone Network (GSTN): An Overview", NeuStar, Inc., Feb. 2003, 27 pages.*
M.Foster, T.McGarry, J.Yu, The Internet Society, "Number Portability in the Global Switched Telephone Network (GSTN): An Overview", NeuStar, Inc Feb. 2003, 27 pages.*
M.Foster, T.Mcgarry, J.Yu, The Internet Society, "Number Portability in the Global Switched Telephone network (GSTN): An Overview", NeuStar, Inc Februrary 20003, 31 pages.*
Cisco Systems, Inc., "Cisco PGW 2200 Softswitch", Copyright © 1992-2002, 16 pages.
The Internet Society, "Number Portability in the Global Switched Telephone Network (GSTN): An Overview", Copyright © 2003, 27 pages.

* cited by examiner

*Primary Examiner* — Asad Nawaz
*Assistant Examiner* — Jason Harley
(74) *Attorney, Agent, or Firm* — Fish & Richardson P.C.

(57) ABSTRACT

Architectures, arrangements, systems and/or methods for an Internet protocol (IP) telephony system for enterprise applications that is efficiently provisioned and maintained are disclosed. In one embodiment, a single platform uses a label allocation and routing scheme to provide overlapping dial plans for multiple customers, E.164 mapping and enhanced regulatory enhancements for both wireline and wireless telephony devices.

18 Claims, 10 Drawing Sheets

NETWORK ARCHITECTURE FOR HOSTING VOICE SERVICES

RELATED APPLICATIONS

This application claims the benefit of U.S. Provisional Application Ser. No. 60/665,523, filed Mar. 25, 2005, which is incorporated herein by reference in its entirety.

BACKGROUND OF THE INVENTION

Embodiments of this invention relate to network communications. More particularly, embodiments of the present invention relate to versatile architectures, arrangements, systems and/or methods for an Internet protocol telephone system for enterprise applications that are easily provisioned and maintained.

Telecommunication networks traditionally utilize the SS7 global standard to define the procedures and protocol by which digital signaling network elements exchange information. More specifically, SS7 is a digital signaling network that is used to effect wireless and wireline call setup, routing and control and is often referred to as the public switched telephone network or PSTN. Although the vast majority of telephony services are currently provided over the PSTN, there has been a recent shift toward use of internet protocol (IP) networks for transmission of voice and multimedia.

IP telephony, also known as voice over Internet protocol or VoIP, is a technology that allows telephone conversations to be made across the Internet rather than exclusively over regular PSTN phone lines. Indeed, IP networks are being rapidly adopted by large enterprises to replace telephony systems that rely solely on the PSTN.

A large enterprise can have thousands of employees located throughout the world, each of who must have access to the enterprise's corporate internal telephony system. In other business settings, an office park may host several hundred smaller enterprises, each of which has several telephony devices.

Because IP telephony solutions bypass the toll-based feature of the PSTN, enterprises reap considerable cost savings by switching to IP-centric telephony systems. However, many enterprises find that it is difficult to provision and manage a large, multi-sited deployment. The task of provisioning and managing thousands of telephony devices is complex and expensive because of the multiple sites and the sheer number of telephony devices that must be supported. To support large deployments, vendors of IP-centric telephony systems must provide enterprises with a managed service that supports multiple sites with a full-feature service offering, such as connectivity between sites so that users may use a short form dialing between sites, that users have come to expect from the legacy PSTN system. Further, the IP telephony system must comply with regulatory environment such as providing contact information to emergency personnel, line tapping and the like. Unfortunately, when deployed on a global scale, such service offerings are not easily implemented and are difficult to manage on an on-going basis.

The difficulty only increases when mobile users are considered. For example, it is common for employees to work at many different locations within a site or to travel between sites so that regardless of where they are located, their telephone service needs to follow. There is also a need to extend the benefits of an IP telephony network to smaller enterprises that only have a few telephony devices. Unfortunately, in a typical implementation of an IP telephony solution, each site must have its own network interface equipment to handle the call processing function. This 1:1 relationship is expensive because it does not allow segmentation between customers and because most customers cannot justify the cost of an enterprise level IP telephony solution. Notwithstanding the cost, there is great demand for a hosted IP network that can be deployed at business parks or by service providers who wish to offer telephony products to smaller enterprise subscribers. However, it is also difficult to segment the IP network access so that multiple smaller enterprises may share common network interface equipment. Clearly, there is a need to provide an IP telephony system that is adaptable to unique provisioning and management needs of both the large and small enterprise.

Users sometimes assume that IP telephony devices include features such as caller identification where the caller's name and address are transmitted along with the call to other users or to emergency operator. However, IP telephony systems depend on the Internet provider to transfer the call from the IP network to the SS7 emergency network, which is often error prone and unreliable. Clearly, defining broad new categories of services that straddle the intersection of computers and phones is a challenging task, especially so at the enterprise level. To illustrate, if an enterprise has thirty thousand employees located around the world who use the enterprise's IP telephony network, the IP telephony system must be robust enough to provision and manage the user's needs regardless of the site where they are located.

Unfortunately, the ability to provide many IP telephony services is directly impacted by the need to interface the IP telephony device with the PSTN while providing the features of an enterprise class phone system. The PSTN currently relies on a numbering plan commonly referred to as the E.164 numbering plan. This plan allocates numbers to devices such as wireline telephones, facsimile machines, cellular or wireless phones and other devices that connect to the PSTN. Thus, even though more and more enterprises and individuals will transition their telephony services from PSTN to the IP network in the future, for the foreseeable future, the need to interface the IP network with the PSTN remains. For this reason IP network devices often require an E.164 number to be associated with the IP telephony devices. Because of the need to correlate the IP network device number to its E.164 number, provisioning an IP voice network for IP telephony is challenging and is limited by the typical constraints imposed by the E.164 numbering system. This correlation requirement increases costs and results in a complex administrative challenge to set up and maintain.

It is readily acknowledged that telephony service providers must increasingly depend on managed IP telephony to remain competitive. Typical of the problems with managing the IP telephony network of an enterprise arises when employees float from location to location. What is needed is a system that can maintain an association between an employee's phone and the location where they logged in so that their phone preferences will follow them to the new location. What is also needed is a system that adapts to local regulation in terms of identifying the location of the employee when they make an emergency call.

Accordingly, what is needed is a carrier-class and scalable IP telephony system that may be deployed at multiple locations throughout the world that can readily adapt to the provisioning needs of various enterprises. What is further needed is a system that can provide enterprise-level telephony services to a large number of smaller enterprises at an affordable and cost-effective price point. Further, what is needed is an IP telephony system that supports the provisioning and management. Further still, what is needed is an IP telephony system that provides the standard public safety and business features that are typically provided by the traditional SS7 telephony network regardless of where the user is located.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, parts, and/or the like. In other instances, well-known structures, materials, or operations are not specifically shown or described in detail to avoid obscuring aspects of embodiments of the present invention.

To overcome the disadvantages of prior art IP telephony systems, the present maps a media tag to each device connected to the IP telephony network. These media tags are then used in a unique routing scheme in combination with a translation scheme that maps an internal (or private) label to an external (or public) number to provide a flexible network architecture that is scaleable for the enterprise level telephony market. More specifically, the present invention abstracts an enterprise's private numbering plan behind user labels that are used as private voice user labels. Every device connected to the IP telephony network has a unique media tag and this tag is used to construct a user label. The user label is used in routing the call across the IP telephony network or in transferring the call to the SS7 network. Using the user label, a virtual number plan is constructed having an originating label and a termination label that describes the call's origination and termination points, respectively. The virtual number plan readily adapts to re-direct or forward calls for mobile users. Advantageously, the virtual number plan does not require an equivalent E.164 number for routing between sites and it is not based on 10-digit number PSTN dialing. Rather, voice calls are routed on the IP telephony network using user labels.

Figure 1:
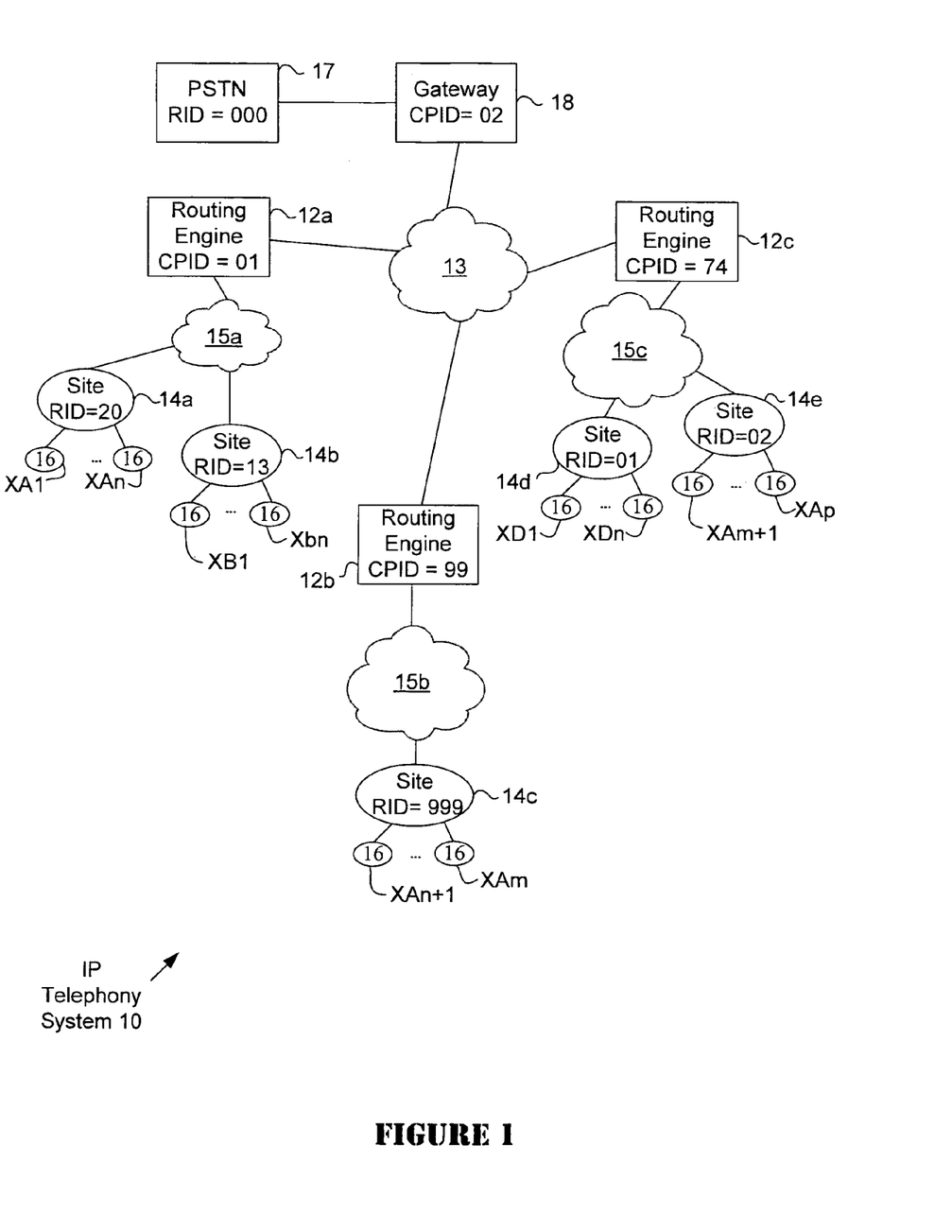
FIG. 1 is a simplified block diagram illustrating the topology of an IP telephony network in accordance with an embodiment of the present invention.
Figure 2A:
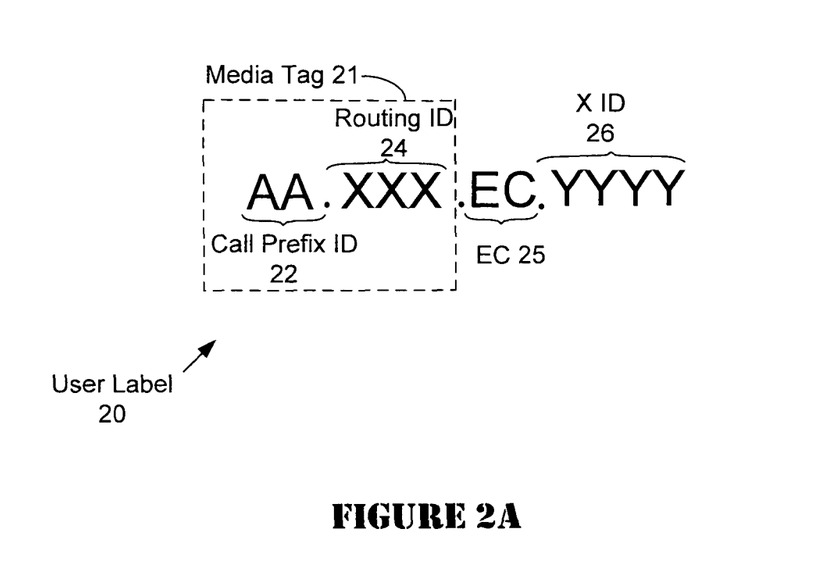
FIGS. 2A and 2B illustrate embodiments of a user label in accordance with an embodiment of the present invention.

Referring now to the drawings more particularly by reference numbers, an embodiment of a representative Internet Protocol (IP) telephony system 10 is illustrated in FIG. 1, in conjunction with FIG. 2A, that simplifies provisioning and management of both users and devices. FIG. 1 illustrates one embodiment of the present invention where IP telephony system 10 includes a plurality of routing engines 12 interconnected by an IP telephony network 13. Network 13 preferably comprises a voice virtual private network (VPN), which is part of the Internet.

As illustrated in FIG. 1, three routing engines are individually designated as 12a, 12b and 12c and are collectively referred to herein as routing engines 12. In other embodiments, there may be more or fewer routing engines 12. Each of the routing engines 12 functions as the access, routing and gateway for a number of sites, which are collectively referred to as sites 14. As illustrated, routing engine 12a provides routing functions for sites 14a and 14b, while routing engines 12b and 12c provide routing functions for site 14c and sites 14d and 14e, respectively.

A site is essentially a location, anywhere in the world, where an enterprise maintains an office. For example, a large financial institution may have several hundred users at smaller sites, such as sites 14a and 14e and several thousands more users at a campus site 14c, all of who share a common virtual number plan. This enables an enterprise that has tens of thousands of employees located at sites around the world to provide a common dialing plan, including short form dialing, for each user regardless of where the user is located on IP telephony system 10.

Alternatively, a site may be a location where two or more independent enterprises share a common routing engine 12 to access the IP telephony network 13 with each enterprise having a different virtual number plan. By way of example, a business park may lease space to multiple small enterprises at a common location and each such small enterprise obtains access to the IP telephony network 13 from a common routing engine 12. Thus, site 14a has a different virtual number plan than an independent enterprise 14b even though both are routed through routing engine 12a.

Users are each assigned a user label 20, which is illustrated in FIG. 2A. Each user label 20 is unique and identifies a specific device or user. User label 20 comprises a media tag 21, which in turn comprises a call prefix ID 22 and a routing ID 24. Appended to media tag 21 are an enterprise code (EC) 25 and an extension ID (X ID) 26. EC 25 operates as a unique site ID within an enterprise but it may overlap with different enterprises.

Call prefix ID 22 identifies a unique routing engine in IP telephony system 10. Each routing engine 12 in the network maintains a lookup table with the address for the other routing engines. Call prefix ID 22 identifies the best path to a specific site associated with routing engines 12. Routing ID 24 is used to uniquely identify each site hosted by a particular routing engine. Note that there is no requirement for routing engines 12 to be located physically proximate to any site 14. Rather each site 14 may be connected to its corresponding routing engine 12 through IP telephony network 13 or, as illustrated, by a proprietary local area networks 15.

If a call originates or terminates to PSTN 17, routing engines 12 pass the call to gateway 18. Gateway 18 provides the interface between the IP network and the PSTN 17.

To illustrate the use of media tag 21, consider site 14a has a routing ID=20 and it is coupled to routing engine 12a which as a call prefix ID=01. Thus, in this embodiment, the media tag for site 14a is 01.020. Note that a leading zero is appended to the routing ID to form a three-digit number. Other media tags may be constructed for each of the other site such as is shown in Table 1 where the media tags for the various sites 14, routing engines 12 and gateway 18 are shown.

TABLE 1

| Routing Engine or Gateway No. | Call Prefix ID | Site No. | Routing ID | Media Tag |
|---|---|---|---|---|
| 12a | 01 | 14a | 020 | 01.020 |
| 12a | 01 | 14b | 013 | 01.013 |
| 12b | 99 | 14c | 999 | 99.999 |
| 12c | 74 | 14d | 001 | 74.001 |
| 12c | 74 | 14e | 002 | 74.002 |
| 18 | 02 | 17 | 000 | 02.000 |

Note that the call prefix ID is illustrated as a two-digit number and the routing ID is illustrated as a three-digit number in Table 1. With this configuration, IP telephony system 10 can support up to one hundred routing engines 12 on IP telephony network 13 and each routing engine 12 may support up to 1000 unique enterprises. In other embodiments both the call prefix ID and the routing ID may have more or fewer digits depending on the network topology of IP telephony network 13. In still other embodiments, the call prefix ID and the routing ID may have either an equal number or an unequal number of digits, again depending on the engineering requirements of a particular enterprise or topology. In still other embodiments, each digit may be an alphanumeric character or other symbol.

The media tag 21 uniquely identifies the best route to get to a designated site or to the PSTN 17 through gateway 18. More specifically, the call prefix ID 22 identifies the routing engine 12 and once the call arrives at the designated routing engine, the routing ID 24 specifies which site to route the call. Note that in some embodiments, each digit of media tag 21 may be an alphanumeric character or other symbol and is not necessarily limited to numeric characters.

Each site 14 further includes a plurality of extension numbers 16 each of which represents either a unique IP telephony device or a user. For example, site 14a has a plurality of extension numbers XA1 through XAn while site 14b has a plurality of extension numbers XB1 through XBn. Some of these extension numbers may be associated with individual users. These extension numbers are denoted as un-bound extensions numbers. Other extension numbers are associated with specific IP telephony devices. These extension numbers are denoted as bound extension numbers.

Unbound extension numbers allow users to float from location to location within an enterprise and access any available IP telephony device. IP telephony system 10 maintains an association between unbound extension numbers and the location of a device that has been associated with that extension either temporarily or permanently. Bound extension numbers, in contrast, are permanently attached to a specific device. Bound extension numbers may also include a user that is bound to a specific device. To illustrate the concept of bound and unbound extension numbers, consider an IP telephone device that is located in a conference room or in a public location. The corresponding extension is bound to that specific device and it never changes its location. In other instances, an employee of an enterprise may not have a defined office but rather may work wherever there is an available desk. In the latter instance, the employee may associate their private extension number with any available telephony device for the duration of their stay. Unbound extension numbers also allow users to travel from one site to another site without having to acquire a temporary extension number. Advantageously, the user may access personalized directory services regardless of the site where they are then currently working. Note that although FIG. 2A shows the extension number, at extension ID 26, as comprising five digits in one embodiment, the extension numbers, in other embodiments may more or fewer than the illustrated five digits. Further, there is no requirement that bound and un-bound extensions have the same number of digits. In other embodiments, a call type code 28 may optionally be provided to identify call classification information. For example, type code 28 may identify whether a call is to be forwarded to a specific location, whether the call is to be transferred to voice mail, priority information or whether the call includes both voice and video. A caller may use priority information to barge in on a pre-existing call. This feature is helpful in an emergency or in a call center environment.

Figure 2B:
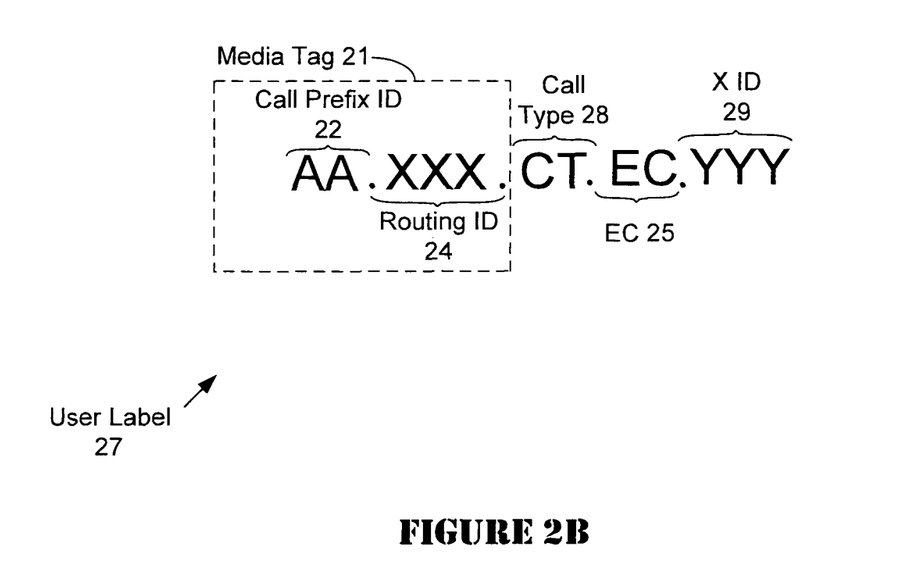

The virtual number plan of illustrated in FIGS. 2A and 2B comprise a hierarchical user label that enables each routing engine to support up to 1000 site with each site having up to a five-digit extension number with a two-digit site code prefix, if desired. If a site wishes to utilize a one-, two-, three- or four-digit extension number, automatically padding the extension sub field with zeros easily accommodates the shorter extension number. A significant advantage of the present invention is that extension numbers of one co-site can overlap with the extension numbers of a co-site because each site is independently provisioned. Co-sites are all the sites connected a common routing engine 12. For example, the independent enterprises at sites 12a and 12b are co-sites because they share common routing engine 12a. Further, there is no requirement for any extension or site to have an equivalent E.164 number. Routing engines 12 preferably have knowledge of the E.164 numbering plan and maps between E.164 numbers and the internal format as and when necessary. Line function 34 does not have such knowledge so its call processing requirements are greatly simplified. The mapping allocation provides a mechanism by which it is possible to have internal-only extensions with no equivalent E.164.

By combining the media tag 21, enterprise code 25 and extension ID 26 user labels 20 are unique. Conversely, each device or user is uniquely identified on the network by the user label 20. Thus, when a call arrives at a routing engine, the hierarchical user label concept allows the routing engine to efficiently determine the destination. To illustrate, for a user label of 01.020.02.00200, it is a simple matter to route the call to the appropriate extension by examining the user label to determine where a user or device is located. The user label identifies the destination routing engine as routing engine 12a, and the 002 routing ID identifies the site as site 14a. The enterprise code of 02 identifies the location of the office at site 14a. The enterprise code is useful if there are multiple locations or buildings. The collection of buildings at a single site is often referred to as a campus site. The extension number of 200 identifies the user or device.

Figure 3A:
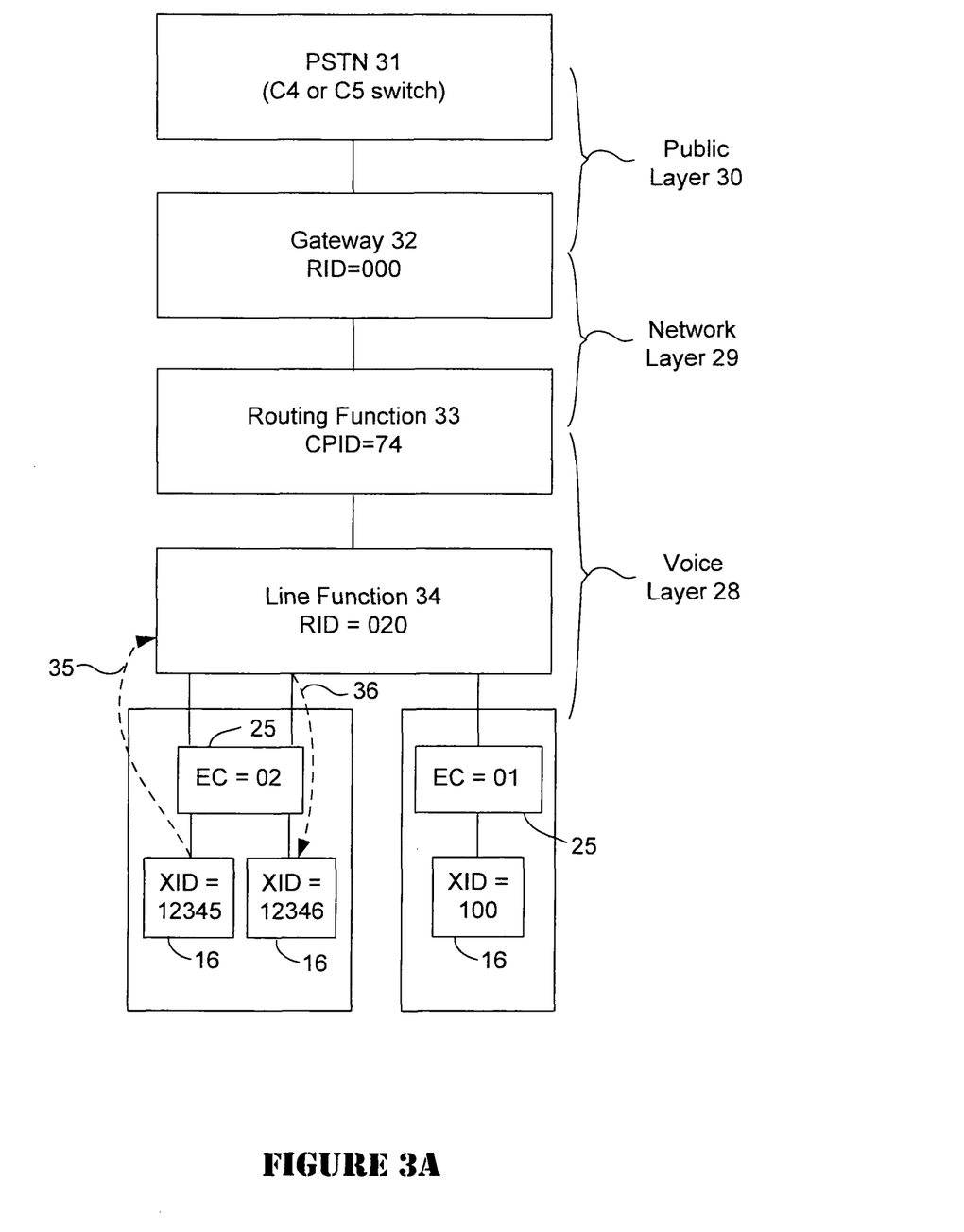
FIGS. 3A, 3B and 3C are simplified block diagram illustrating an embodiment of the present invention.
Figure 3B:
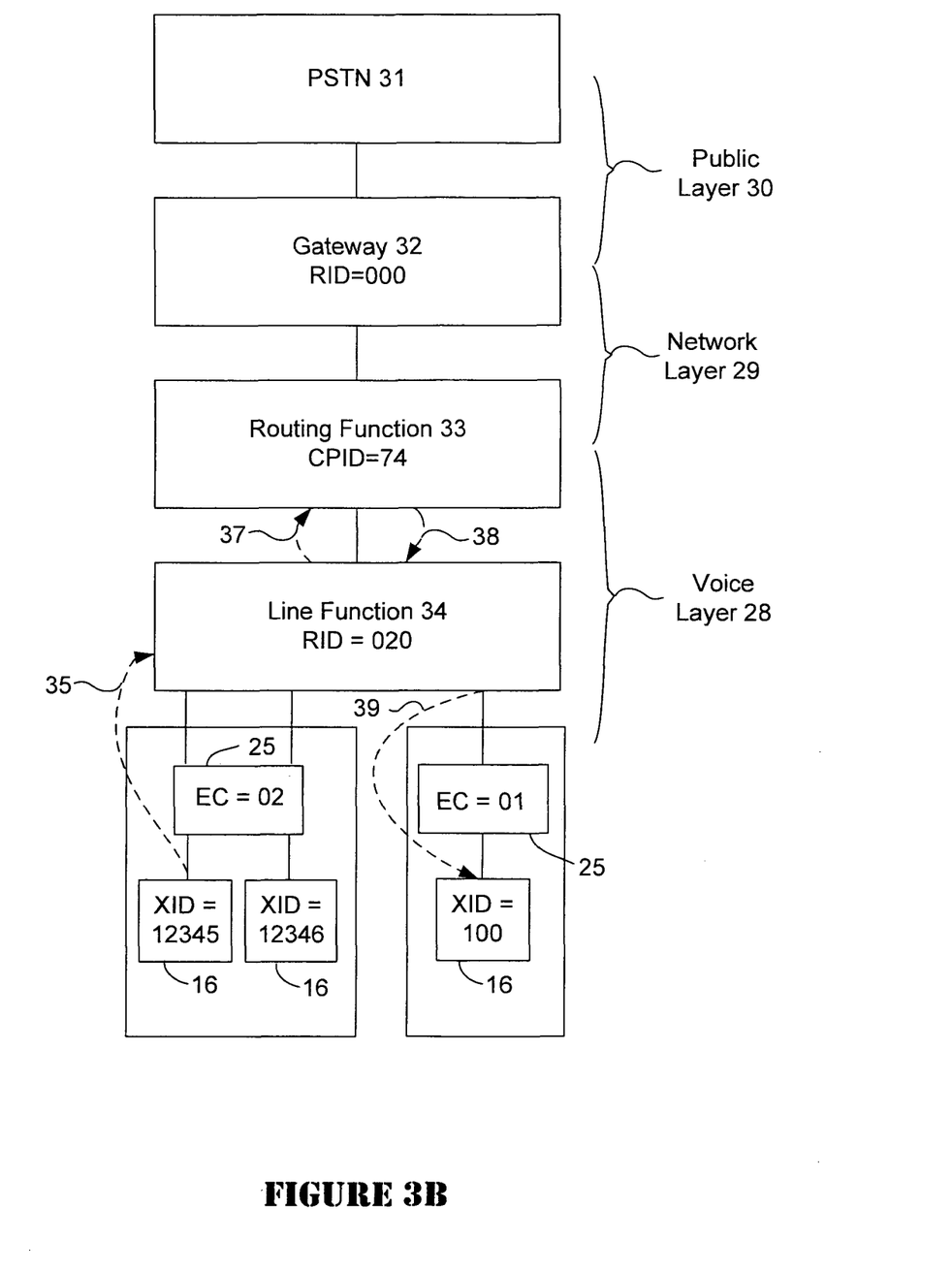
Figure 3C:
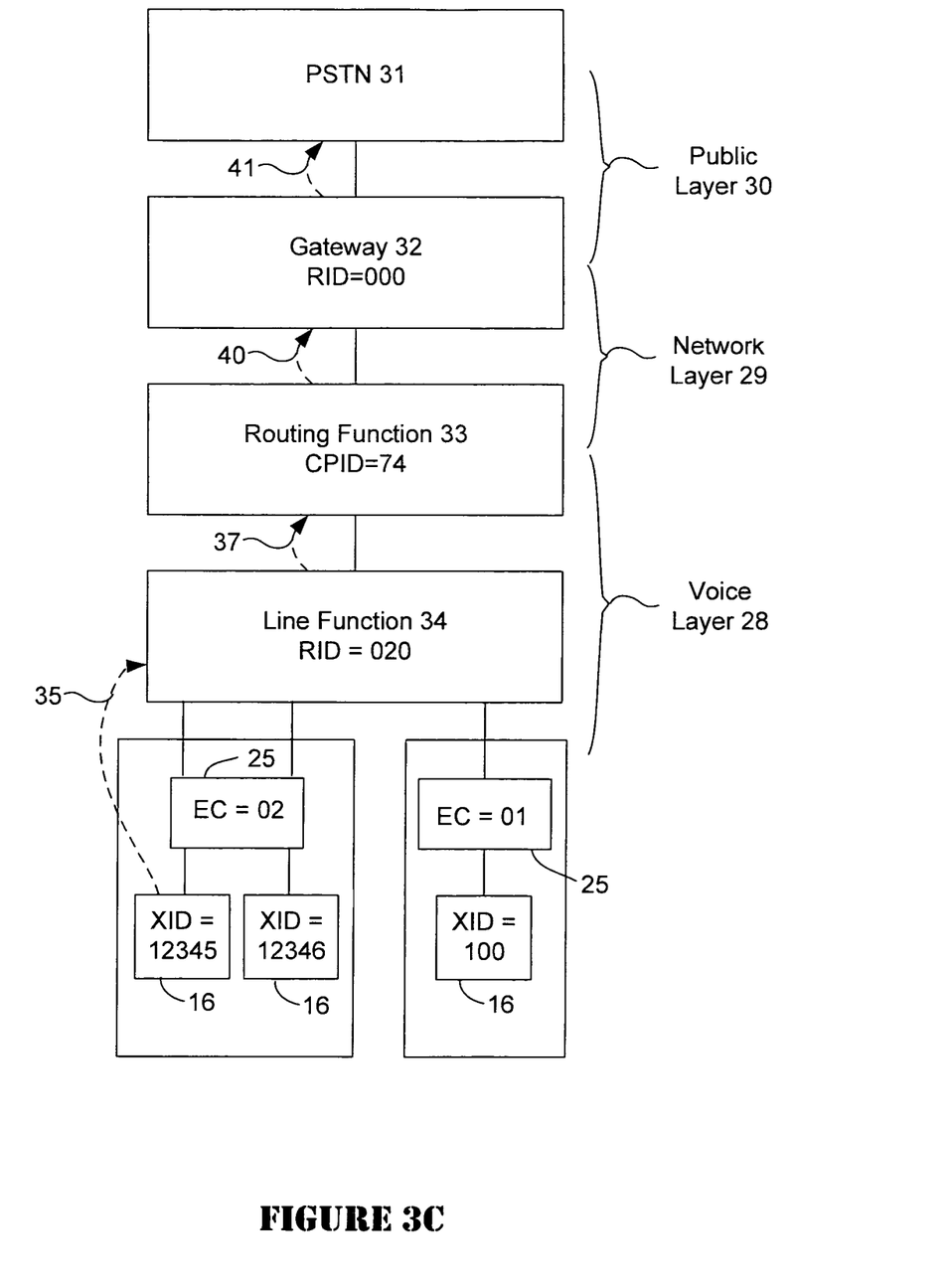

Refer now to FIGS. 3A, 3B and 3C that illustrate the hierarchical layers of the IP telephony system 10. Specifically, in one embodiment, there are three conceptual layers, a voice layer 28, a network layer 29 and a public layer 30. Public layer 30 comprises the gateway transition from the time-division multiplexing (TDM) switches of PSTN 31 to the internal IP network. This transition is handled by gateway 32 so that in-bound calls may be routed on the IP telephony system 10 and out-bound calls may be transferred from the IP network to the PSTN. The transition from the network layer 29 to the voice layer 28 is handled by routing function 33. Line function 34 manages the voice layer 28.

Gateway 32 provides interoperability between legacy PBX systems, the PSTN 31 and the IP telephony system 10 by performing digit analysis, routing and circuit selection within the PSTN infrastructure. Gateway 32 may utilize the Signaling System 7 (SS7) protocol or an Integrated Services Digital Network/Primary Rate Interface (ISDN-PRI) standard. If the business application dictates selection of the SS7 PSTN 31, then this will be interworked to industry standard VoIP protocols. In general, gateway 32 maintains a protocol library to support a variety of industry-standard control protocols, including, by way of example, Media Gateway Control Protocol, H.323, and Session Initiation Protocol. In one preferred embodiment, gateway 32 includes an H.323 gatekeeper to provide basic infrastructure capabilities such as registration capability for a Cisco PGW, Cisco CallManager, H.323 customer premises equipment (CPE) or any H.323 customer devices. The gatekeeper forces all routing to use the Cisco PGW. Gateway 32 provides translation of protocols for call setup and release and transfer of information between the PSTN 31 and the H.323 based IP telephony system 10. Gateway 32 may also map user labels to a corresponding E.164 number. The user label may be a DNS address or a dotted IP address. In addition to providing interoperability, gateway 32 provides billing, management services and statistics, call forwarding and call re-direction.

Gateway 32 preferably implements both the European standard QSIG for site-to-site connection and its predecessor, DPNSS, which refers to the Digital Private Network Signaling System to provide interoperability with legacy PBX systems. This interoperability enables large enterprises with 50,000 to 100,000 telephony devices to phase in IP telephony without having to maintain two parallel systems. Thus, a large enterprise may transition to IP telephony without impacting its business operations.

Routing function 33 resides at routing engine 12. It routes calls between sites 14 that are not co-sites. Routing function 33 also routes calls between a site 14 and the PSTN 31. Calls between extensions at a common site, or between extensions at co-sites, are routed by line function 34. Line function 34 resides at each site 14 or, alternatively, at routing engine 12. Line function 34 manages each telephony device, providing functionality to each enterprise while maintaining segregation. For example, the network infrastructure components may set up a private VPN at each site 14, which is then accessed in a segregated manner by each enterprise. Line function 34 provides PBX functions to control intra-site calls and further provides telephony features such as call waiting, out-going call blocking, conference calls, emergency calls and other such features. Both routing function 33 and line function 34 may be distributed across a wide area network and are not constrained to live in an IP data network domain. Each device 16 when attached to the network acquires an enterprise code 25, which in FIG. 3A is a value of 02 for both extensions 12345 and 12346 and a value of 01 for extension 100.

Call indicators 35 and 36 illustrate the path taken by a call between users located at an enterprise. In this example, telephony device 16 has an X ID of 12345 and has a user label of 01.020.02.12345 and user label 01.020.02.12346 identifies the other extension. Line function 34 recognizes that each telephony device 16 participating in the call has a common call prefix ID and routing ID so it retains the call and does not pass it to routing function 33. Accordingly, line function 34 handles call routing between extensions. It should be noted that the user does not need to dial the destination label. Indeed, neither the called user nor the calling user need to have any understanding of the destination or originating label. Rather, a user need only dial an inter-site prefix and then a site code plus extension of the user they want to connect to. The call is then automatically mapped to the destination label by the routing function and handled appropriately.

FIG. 3B illustrates the case where a call is made between two extensions located at two different sites. When the extension identified by the user label 01.020.02.12345 initiates a call to an extension identified by the user label 01.020.01.00100, the call is passed to line function 34 as indicated by call indicator 35. Line function 34 recognizes that the extension identified by the user label 01.020.01.00100 is at a different enterprise so the call is passed to routing function 33 as indicated by call indicator 37. Line function 34 services are segmented so that it only routes call between local extensions within a single enterprise so when a different enterprise code is encountered, the call is passed to the routing function 33.

At routing function 33, a user label translation process determines the best network route to the called or target user label. After voice NATing the label, routing function 33 passes the call back to line function 34 and on to the telephony device 16 having extension ID=100 as indicated by call indicators 38 and 39. Router function 33 maintains control information that identifies the caller and the location from which the call was made which is necessary for emergency and other call tracing applications.

Note that routing function 33 passes call control to the line function 34 indicated in the user label which in this example is a co-site sharing a common line function 34. In other embodiments, each line function 34 is dedicated to a specific enterprise and would necessarily have a different CPID and/or RID. Further, it should be noted, that while it is possible for line function 34 to route the call directly to an extension located at a co-site when the RID is the same, it is preferred that routing function 33 handle inter-enterprise calls so that various enterprise level functions may be provided and for implementing law enforcement intercept capabilities.

To illustrate, in order to dial between enterprises, a calling party must use public dialing conventions and dial the E.164 number. Therefore, for a calling party at one enterprise to dial another party at a different enterprise, they must dial an external prefix (for example, the numeral 9), plus the local, national or international number of the device they want to connect to. The routing function recognizes that the dialed number is also on the IP network and will translate the E.164 number to its internal number. The call is then routed based on the internal number.

It is important to note, that for a call made to another device within the enterprise, there is no number translation. For calls made to another enterprise, two translations are made. First, the called number is translated from E.164 to an internal IP network number. Second, the calling number is translated from an internal number to a unique E.164 equivalent. Alternatively, if the calling number is one of a plurality of an internal extension that shares a common E.164 number (that is, the calling number is one of n devices mapped to a common E.164 number), it is translated to the common E.164 number. For call from an enterprise to an E.164 number on the PSTN, the calling number is translated to either its unique E.164 number or the shared E164 and the called number is passed to the PSTN by the gateway. For calls from the PSTN to a called number in the enterprise, the called number is translated to an internal routing number.

FIG. 3C illustrates the case where a call is made from one of the devices 16 to an E.164 number on the PSTN. In order to route the call to a telephone residing on the PSTN 31, the call must be routed as indicated by call indicators 35, 37, 40 and 41. Specifically, when the call is initiated the user dials an access code, such as the number 9, which the line function 34 recognizes as a request for a connection to the PSTN. Line function 34 passes the dialed number rather than a user label to routing function 33. Upon receipt, routing function 33 performs a user label translation to determine the gateway RID before sending the E.164 number to gateway 32. Gateway 32 sends the E.164 number out onto the PSTN 31 where the call is connected in the traditional manner. For calls coming from the PSTN 31, the process is performed in reverse order.

Figure 4:
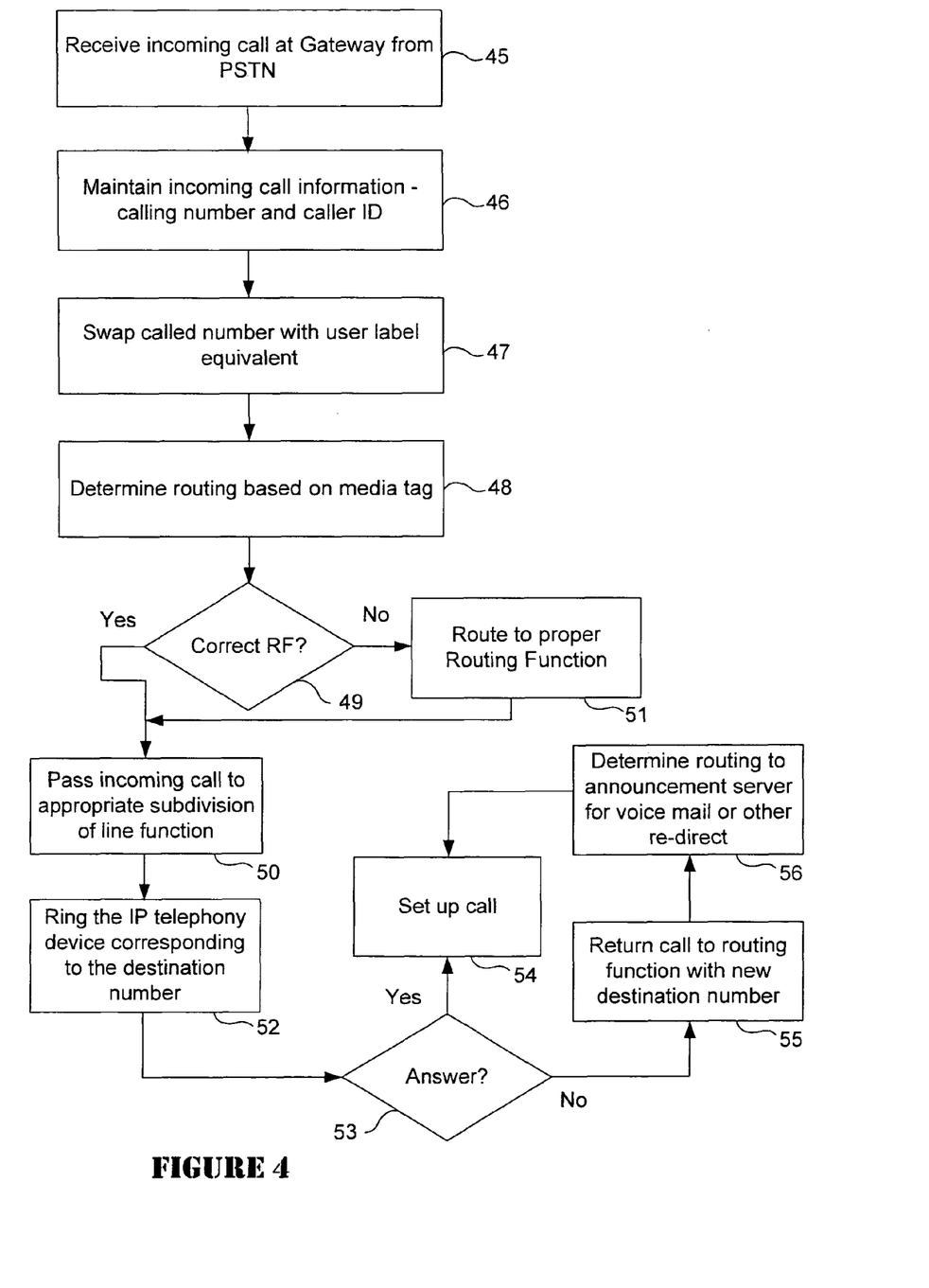
FIG. 4 shows a method for implementing an in-bound call in accordance with an embodiment of the present invention.

FIG. 4 illustrates the operation of the system shown in FIG. 3C. When an incoming call is made to gateway 32, the calling number is received as well as the called number. For example, if the calling number is 01 344 412 345 and the called number is 01 344 42 6010, these numbers are received from PSTN 31 by gateway 32, as indicated at step 45. Both numbers are passed to routing function 33 associated with gateway 32. Routing function 33 maintains incoming call information such as the called number, the calling number and the caller's ID as indicated at step 46.

The routing function then accesses a lookup table to translate the called number into a user label as indicated at step 47. With the user label acquired, routing function 33 looks at the media tag to determine the destination as indicated at step 48. At step 49, a determination is made to see if the destination is associated with the routing function 33 that received the call. If the first part of the label, i.e., the call prefix ID (see FIG. 2A) matches the call prefix of the routing function 33, it is passed to the line function 34 for the specified site as indicted at step 50. If, however, the destination is associated with another call prefix, the call is transferred to the designated routing function over the IP telephony network 13 as indicated at step 51.

After the call is transferred to the correct destination routing function 33, the call is then sent to the appropriate line function 34 using the CPID and/or RID as indicated at step 50. The line function extracts the extension ID from the label and rings the extension for the destination telephony device as indicated at step 52. If there is an answer at step 53, the call is set up as indicated at step 54. The calling party number and identity may be presented in its original form for an outside caller or as an extension number for a caller from the same site.

If there is no answer at step 53, the line function must determine where to send the call. One forwarding destination is to return the call to the router function as indicated at step 55. The routing function may then forward the call to a different extension such as to a voice announcement server as indicated at step 56. In other embodiments, an unbound user label may be forwarded to other sites if the user has subsequently logged into a different device.

Figure 5:
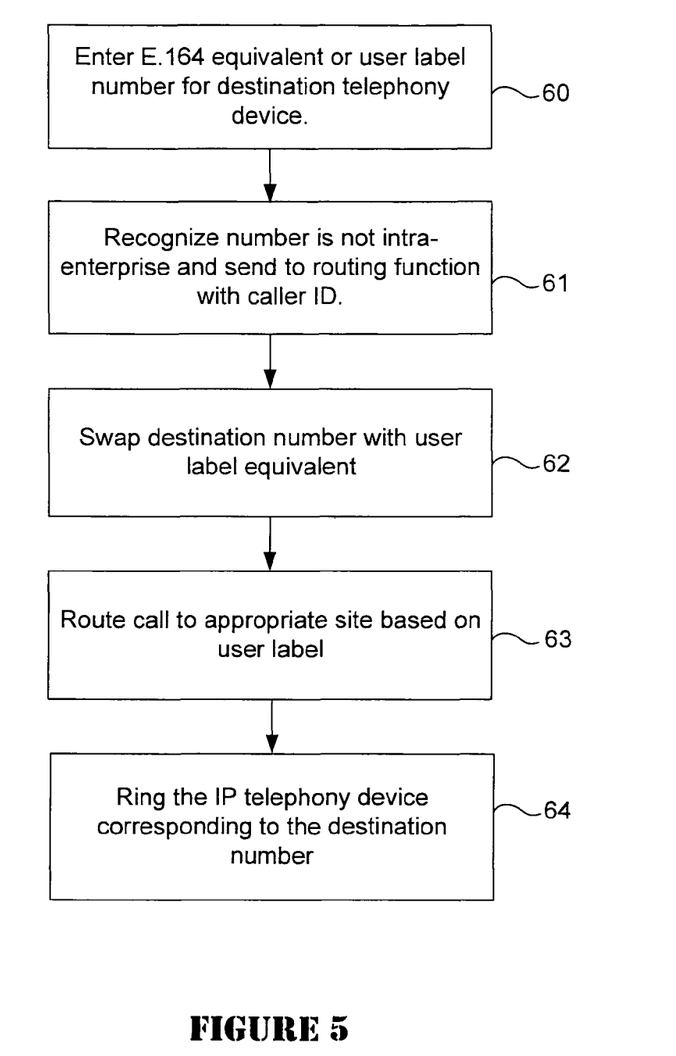
FIG. 5 shows a method for implementing an out-bound call in accordance with an embodiment of the present invention.

FIG. 5 illustrates the call process for the outbound call illustrated in FIG. 3B. For an inter-site call, the called number is entered, at step 60, as either an on-network or an off-network call, such as illustrated in FIG. 2A. To illustrate, when an inter site prefix, plus site code and extension of the destination is dialed, the "routing function" determines if the call destination is an off-network or on-network call via the prefix, and the call is handled appropriately. If the call is an on-network call then the destination user label is generated by stripping the off-network prefix and adding the destination "media tag.

More specifically, line function 34 quickly determines that the call is not an intra-enterprise call by examining enterprise codes in the calling user label and the called number or user label. Then, both the calling party information and the called number or user label are passed to routing function 33 for translation as indicated at step 61. The routing function determines whether the E.164 number maps to a user label and if it does, it performs the user label translation on the E.164 equivalent number to obtain the user label, as indicated at step 62. Routing function 33 then determines the RID and sends the call to the appropriate site as indicated at step 63. Note that the routing function translates the calling number from a label to an E.164 equivalent for display on the called device. Similarly, routing function translates the called number from an E.164 number to a user label to determine the destination of the call. The call is then sent to the telephony device based on the XID portion of the user label in the called number as indicated at step 64. The calling number is displayed as its E.164 number to the destination device.

If there is no answer or if the profile for the called device requests calls to be forwarded, the call is returned to the routing function 33 for re-direction to either another user label within IP telephony system 10 or to an announcement server. If the call is to be re-directed to a destination that is not located on the same site then the forwarding process is handled by the line function.

Figure 6:
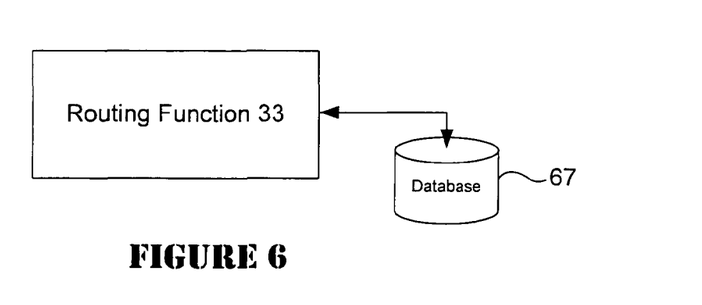
FIG. 6 shows a portion of the IP telephony network in accordance with an embodiment of the present invention.

Routing function 33 performs the translation on the user label by accessing information stored in a database structure such as is illustrated in FIG. 6. Specifically, a database 67 is maintained at each routing function 33 to support number mapping on an individual user or an individual number basis rather than by blocks of numbers. Thus, when a calls is routed by routing function, it is now possible to readily implement a law enforcement intercept by setting up a server to record calls. Database 67 is updated by routing function 33 on a periodic basis or whenever a call is returned as unanswered from line function 34. Voice mail services are supported to the routing function 33 using SIP protocol, which turns on a message waiting light at the IP telephony device.

Figure 7:
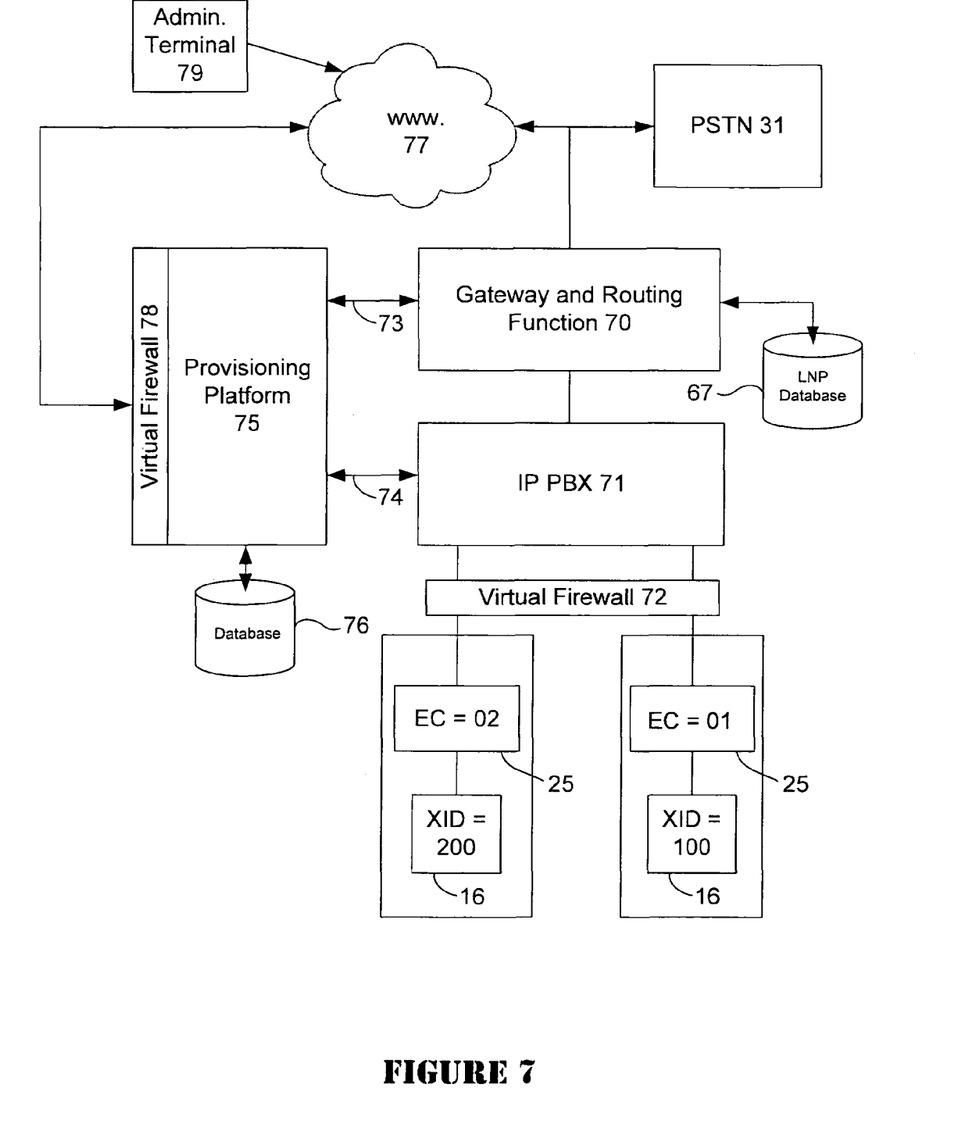
FIG. 7 illustrates a simplified block diagram illustrating another embodiment of the present invention.

Referring now to FIG. 7, another embodiment of the present invention is illustrated. In this embodiment, the functions of gateway 32 and router function 33 have been combined into a single gateway and routing function box referred to as routing function 70. In one embodiment, routing function 70 is a modified PGW 2200 deployed with a voice gateway available from Cisco Systems, the parent of the assignee of the present invention. Router function 70 provides the interface between existing time-division multiplexing (TDM) switches, the PSTN and IP telephony network 13. Router function 70 allows providers to transition from legacy PBX telephone systems to more cost-effective and flexible IP based services. Routing function 70 allows providers to deploy new revenue-generating services, such as PSTN access for business IP voice applications including hosted business services to a number of small to medium enterprises.

Routing function 70 accesses a user label table that is built and stored on database 67. Routing function 70 identifies the media tag 21 to identify where the device is located (that is the site) and uniquely identifies each device at a site by the extension ID. At each site, a segmented IP PBX 71 is adapted to individually support a plurality of individual business enterprises and segments calls based on the enterprise code appended to the user label. IP PBX 71 further handles the line function services, such as video display, voice mail and call forwarding, for each extension. A virtual firewall 72 provides stateful packet inspection on voice or multimedia traffic between the device 16 and IP PBX 71.

Routing function 70 and IP PBX 71 are provisioned by pinhole connections 73 and 74 to a provisioning platform 75. Provisioning information is stored on a provisioning database 76, which may be updated via a web interface accessible from the web 77 through firewall 78. The provisioning platform comprises a "database of records" for all line-based services. An administrative terminal 79 may be used to update provisioning database 76 or each user may access provisioning platform to update their own records in database 76 using open interfaces across a LAN or WAN environment. Terminals 79 provide for fully partitioned central service provider administration or devolved "enterprise/customer" administration. Capabilities include number management and assignment and capability allocation, which is also sometimes referred to as a feature set.

Updates are pushed through connections 73 and 74 to routing function 70 and IP PBX 71 when a record is changed. Alternatively, routing function 70 or IP PBX 71 may acquire provisioning data database 76 on a pre-determined schedule. Routing function 70 acquires provisioning data to configure its user label translation tables, which are stored in database 67, and to update the gateway. IP PBX 71 acquires users profiles for the telephony devices connected at its site or sites. Both IP PBX 71 and routing function 70 provide an API to interface to a variety of third party provisioning platforms.

When a mobile user logs in at a different device or at a different site, the IP PBX 71 queries database 76 to determine the user's preferences. Similarly, routing function 70 can, for example, indirectly query database 76 to determine the voice mail network device for the mobile user to provide mobile users with seamless service. This function is of particular importance when a mobile user initiates an emergency call from a location different from their home location. In this instance, the IP PBX 71 is updated with the users' profile when a user logs in to the network. IP PBX 71 also passes the location information and voice ID label 20 together with log-in information to identify users for the routing function. The log-in information is used to identify the users' location within the network. This information is stored on database 67 and is provided to authorities in response to an emergency call or during law enforcement intercepts.

Figure 8:
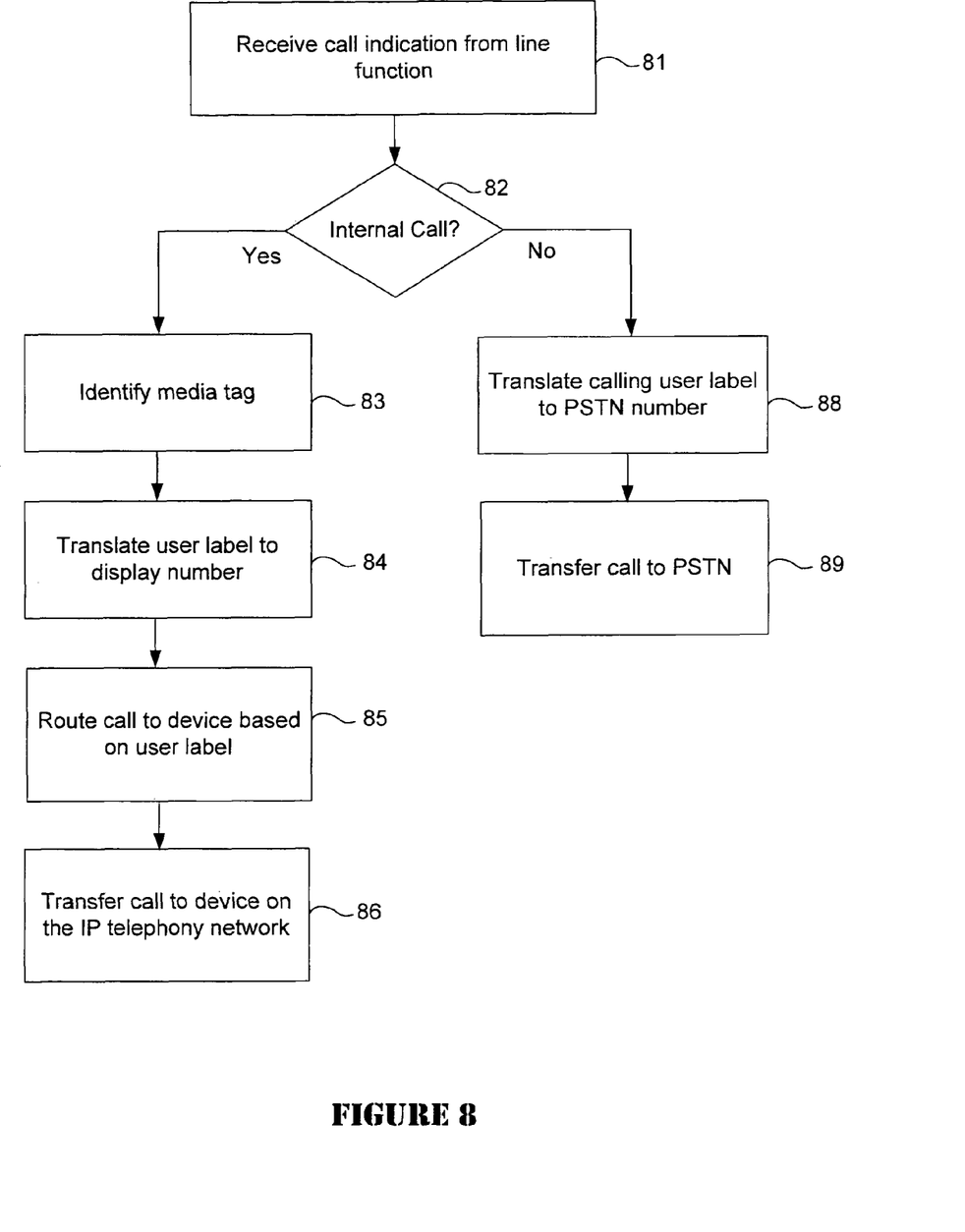
FIG. 8 illustrates another method for routing an out-bound in accordance with an embodiment of the present invention.

FIG. 8 illustrates the user label translation process. Beginning at step 81, when a call is initiated, the line function passes all calls that are not internal to a single enterprise location to the routing function. At step 82, the routing function determines if a media tag is present to determine if the call is to be routed on the enterprise's network, that is an internal call, or whether the call is to be routed to the PSTN. If the call is to an extension on the enterprise's network, the media tag will identify the specific device as indicated at step 83. Before the call is transferred to the called device, the caller's information (such as the name and site code plus extension) is translated to a user friendly format by removing the media tag and other extraneous information associated with the user label as indicated at step 84. Finally, the call is transferred to along the IP telephony network 13 to the called device.

If, in step 82, routing function determines that the called party requires a connection to the PSTN and the translation process proceeds to step 88. At step 88, routing function translates the user label for the calling party to a PSTN number. This translation may be a one to one translation if the user label is associated with a particular PSTN number. Alternatively, the user label is translated to a switchboard number that is shared among many such user labels. This is often referred to as a N-to-1 translation. The call is then transferred to the PSTN through a gateway with both the called number and the calling number in E.164 format as indicated at 89.

To simplify the dialing process and make dialing transparent, it is preferred that the use merely enter a prefix code "7" plus the enterprise code plus an extension to signify that the call is internal to the enterprise. Thus, employees can shorten the number of digits that are dialed. To illustrate, one user at campus building 01 and extension 101 could call a colleague at office having enterprise code 02 and extension 202 by dialing 702202 and they would be immediately connected regardless of whether the call is to an international destination. As the call is processed, the first digit would indicate an intra-enterprise call and the digit are replaced with the media tag based on the value enterprise code. The calling party's user label is shortened and displayed as the calling party's enterprise code and extension.

To signify that the call is to be routed outside of the enterprise, the prefix code "9" may be entered followed by the PSTN number and the user label of the calling party is translated to a E.164 number. Note that the above described prefix codes are examples and it is possible for the prefix codes to be uniquely defined for each customer and/or site.

Figure 9:
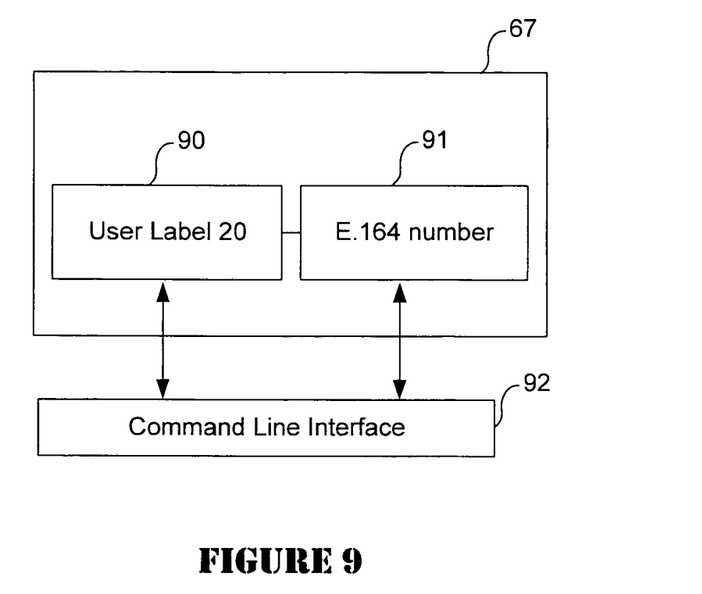
FIG. 9 illustrates a simplified block diagram illustrating a provisioned database structure in accordance with an embodiment of the present invention.

FIGS. 9 and 10 are conceptual illustrations of two database structures used during the translation processes. In FIG. 9, the routing function accesses database 67 that contains a list of E.164 numbers in one relational database 91 and associates those numbers with a corresponding list of user labels 20 stored in another relational database 92. Database 67 is used by the routing function when translating between user labels and E.164 numbers when calls are made to or from the PSTN. Database 91 and database 92 may be updated through a command line interface 93. The link between users labels and E.164 may be bound or unbound. If the bounded, the user is permanently linked to the specific E.164. An unbounded user label may be create an association with an E.164 on a temporary basis and may be updated whenever the users logs in at a different than expected device. Further, the mapping between databases 91 and 92 may be one to one or, alternatively, many user labels may map to a single E.164 number. CLI 92 provides the provisioning API.

Figure 10:
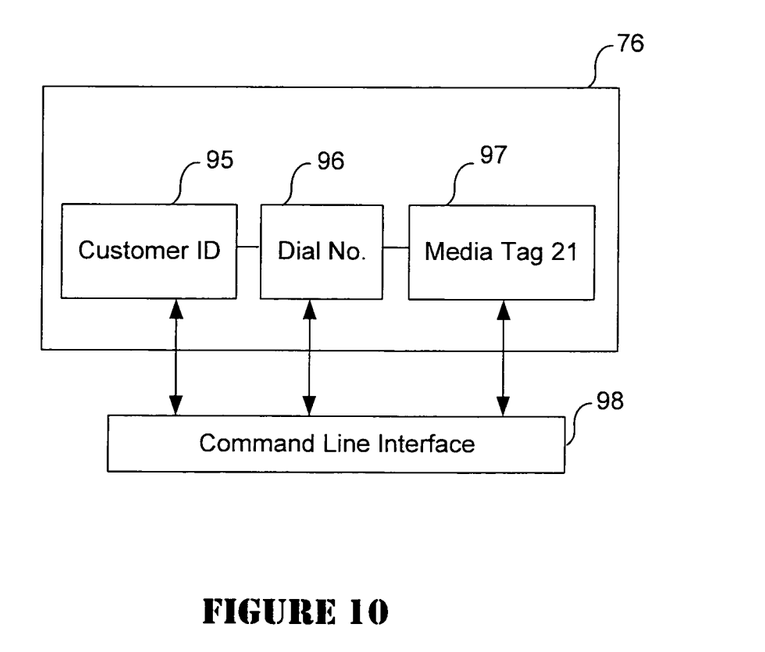
FIG. 10 illustrates a simplified block diagram illustrating the structure of a provisioned database used during the media tag translation process in accordance with an embodiment of the present invention.

In FIG. 10, database 76 comprises at least three relational databases 95, 96 and 97. Database 95 contains an enterprise ID and database 96 contains a corresponding extension number that represents the numbers a customer might dial. The combination of the enterprise ID and the dialed number points to the unique media label, which is stored in database 97. After provisioning the databases 95-97 through CLI 98 calls may be readily translated from a dialed number to a media tag 21 that is readily routed across IP telephony network 13.

Accordingly, the present invention provides an IP network based telephony system that is built once and then readily adapted to any size enterprise. The telephony system interfaces with PSTN legacy systems during the installation to minimize disruption to the enterprise during the changeover. The system includes hooks to a provisioning system that contains a database mapping an enterprise's numbering scheme into a label scheme that supports the IP network voice call routing. When combined with voice NATing, the interface to the PSTN realm is simplified as enterprise employees roam about the system or relocate so that individual employees may provision their telephony device to suit their personal preference.

The present invention offers an end-to-end integrated architecture for VoIP telephony services for large scale, hosted, multi-tenant deployments and large-scale, multi-site enterprises and public institutions. Large enterprises and public institutions (e.g. city and government bodies) will often consist of multiple internal 'tenant' customers and may also require a form of 'multi-tenant' support. The present invention supports a rich range of customer features (including virtual IP-PBX, Extension Mobility, Voicemail, XML interface, etc.) and this in turn presents a range of possible packaging and customer operations options. This can be helpful in terms of differential pricing and aiding network and dial-plan optimization. It can also assist support for different customer operations models that handle different customer types.

The present invention provides a platform that supports a number of potential product offerings to assist discussion on packaging options.

The present invention provides voice features that are configurable as appropriate via the provisioning platform and/or via a phone browser screen. Such features may include: Calling Line Identification Presentation (CLIP) and Restriction (CLIR); Call-by-Call Calling Line ID Restriction and Presentation; Direct Dial In (DDI) and Internal Line Extensions; Class-of-Service settings; Calling Name Identification; Soft-key templates; Speed-dials; Call Hold (CH)/Call Resume; Call Waiting (CW); Music-on-hold selection by phone; Call Transfer (CT) with and without consultation; Call Back; Call Park; Barge; Three-Party-Conferencing; Call Forwarding (CFA, CFB, CFNA) by line; Call Pick-Up; Group Pick-Up; Shared Line; Extension Mobility; Soft-key variations by phone; Directory for missed, received, placed calls; Number publishing for end-users; XML services; and Enhanced XML services.

The present invention also provides related dial-plan & management features such as: multi-tenant support; customer-site dial-plan management (including input to number portability support); dial '0', '9' or other digit for outgoing PSTN calls (country specific); devolved administration to customer and site administrators; multiple phone types & phone templates; end user phone self provisioning; end user self care; end user phone association; phone replacement; multi-tenant attendant console (switchboard); service configuration (Netwise); multi language support (for telephone and admin GUIs); bulk load of enterprises and end-users number and profiles and lawful intercept solution design.

The present invention advantageously provides for inter-site short prefix dialing for enterprises with multiple sites. Thus, rather than dialing an E 164 number to ring between the sites of a specific enterprises, users can ring a prefix digit, a site code and then the extension number of the called-party.

The architecture of the present invention enables the integration of an attendant console system and related contact management system, i.e. a 'multi-tenant (MxU) attendant console' service as part of the overall multi-tenant, hosted-managed IP telephony solution. In contrast to single-enterprise deployment with associated attendant console capabilities, the requirement here is to provide an attendant console platform that can simultaneously support multiple consoles, each managing operator calls into separate enterprise sites (without conflict). Each MxU attendant console may be provisioned via a GUI as part of 'site management' thereby considerably reducing configuration complexity and allowing rapid service set-up and modification by administrators while minimizing the risk of configuration errors.

The present invention also provides support for web-enabled audio conference bridge application that enables people in multiple locations to participate in remote phone meetings. A web-interface for setting up conferences and (optionally) for creating a virtual space where multiple participants can share presentations, control the volume of individual participants, and ask questions. As a billable service, the conferencing service may be restricted to provisioned end-users who have been set up with a 'member' profile. An established member with a profile can create and manage meeting reservations. Meetings can be set-up as Ad-hoc, Meet-Me or Analyst conferences.

There are two types of participant in a conference: Active and Listener. Ad-hoc and MeetMe conferences only involve active participants. Analyst conferences involve active and listener participants. Conference bridge configuration parameters include: maximum number of conference bridge ports subscribed to, conference call number, maximum conference duration, maximum number of active and passive participants and maximum reservation lead-time.

The present invention manages hosted, multi-tenant, IP voice services, provisioning and service management platform layer designed specifically to address the challenges involved in managing all of the components required to support a hosted-managed IP telephony architecture. This platform layer provides a plurality of functions to support a managed IP telephony deployment. A partitioned data schema underpins the architecture of the platform layer that links a service provider, IP telephony infrastructure customers, sites, phones, lines, end-users, and services and to represent different customer groupings which is key to multi-tenant support on shared, multi-cluster infrastructure.

The present invention may use a web-based graphical user interface for use both by administrators, from both the service provider and enterprises, and by end-users (to support 'self-care' features). Access can either be via a PC-screen or via a phone browser. Screen templates (skins) may be changed if required so that enterprise customers can brand their own administration screens. Web-screens are 'role-based' such that administrators and end-users are only provided with functionality appropriate to their role. Menu-templates are configurable, allowing multi-language support. Some service providers may also wish to support an IVR (intelligent voice recognition) interface. SOAP-based XML-based protocols are preferred but proprietary protocols may be readily created for by introduction of a protocol transformation stage. SNMP-based messaging can also be provided for interworking with NMS systems. Message queuing support is also allowed via integration message queuing facilities within third party EM middleware which is commercially available from a variety of vendors.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "configuration" of a network device may include the storage and execution of computer code from memory locations associated with said network device to determine how network traffic is handled. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as an example, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for managing in-bound voice traffic in an IP telephony network in an enterprise, the method comprising:
   receiving, at a routing engine, an incoming call from a gateway in communication with a public switched telephone network (PSTN), wherein the received incoming call comprises a calling number, a called number, and a caller identification;
   accessing a mapping of called numbers to individual user labels for uniquely identifying destination telephony users in the IP telephony network from a database maintained at the routing engine, the user labels comprising:
      a call prefix for identifying unique destination routing engines within the IP telephony network,
      a routing identification, distinct from the call prefix, for identifying sites hosted by each destination routing engine, and
      an extension identification, distinct from the call prefix and the routing identification, for identifying destination telephony users at each site;
   based on the mapping, translating the called number to a particular user label for identifying a destination telephony device in the IP telephony network;
   determining that the call prefix of the particular user label matches a call prefix assigned to the routing engine; and
   identifying a site hosted by the routing engine and having an assigned routing identification matching a routing identification of the particular user label; and
   transferring the incoming call from the routing engine to the site hosted by the routing engine and having the same routing identification as the routing identification of the particular user label, wherein the user label comprises a form of AA.XXX.EC.YYYY.

2. The method of claim 1, further comprising:
   routing the call to an announcement server if the telephony device is not activated; and
   using session initiation protocol (SIP) protocol to activate a message waiting indicator.

3. The method of claim 1, further comprising:
   logging in a mobile user to obtain login information; and
   passing the login information to a routing function at a visitor's location and updating a routing function at a home location for the mobile user.

4. The method of claim 3, further comprising:
   forwarding an in-bound call initially directed to the home location to the visitor's location.

5. The method of claim 1, further comprising provisioning a routing function and a line function to control a routing of in-bound voice traffic to the IP telephony device.

6. The method of claim 1, wherein the user label further comprises a call type code between the media tag and the enterprise code, the call type code indicating at least one of: forwarding the incoming call to a specific location, transferring the incoming call to voice mail, a priority of the incoming call, and whether the incoming call includes both voice and video.

7. The method of claim 1, wherein the user label further comprises an enterprise code, wherein the enterprise code is separated from each of the media tag and the extension identification by period characters to designate hierarchy in the user label.

8. The method of claim 7, wherein transferring the incoming call from the routing engine to the site hosted by the routing engine and having the same routing identification as the routing identification of the particular user label further comprises transferring the incoming call to a destination telephone device associated with an enterprise at the site, wherein the routing engine determines the enterprise associated with the destination telephone device and located at the site based on the enterprise code, and the destination telephone device for the incoming call using the extension identification.

9. The method of claim 1, wherein the destination routing engine is directly connected to the gateway.

10. The method of claim 1, wherein the user label includes an enterprise code for identifying particular enterprises at a common site and which is distinct from the call prefix, the routing identification and the extension identification, and
wherein the user label comprises a form of AA.XXX.EC.YYYY, wherein:
AA indicates the call prefix,
XXX indicates the routing identification,
EC indicates the enterprise code, and
YYYY indicates the extension identification.

11. A method for managing in-bound voice traffic in an IP telephony network in an enterprise, the method comprising:
receiving an incoming call at a gateway from a public switched telephone network (PSTN), wherein the received incoming call comprises a calling number and a called number;
passing the calling number, and a caller identification to a receiving routing engine that is associated with the gateway;
translating the called number to a user label for uniquely identifying a destination telephony device in the IP telephony network, wherein the user label includes a media tag to identify a destination routing engine associated with the destination telephony device, the destination routing engine maintaining a look up table of other routing engines, the media tag comprising:
a call prefix for identifying the destination routing engine in the IP telephony network, and
a routing identification for identifying a site hosted by the destination routing engine; and
transferring the incoming call from the receiving routing engine to the destination routing engine, the transferring facilitated by the media tag of the user label,
wherein the user label comprises a form of AA.XXX.EC.YYYY, wherein:
AA.XXX indicates the media tag;
EC indicates the enterprise code; and
YYYY indicates the extension identification.

12. An apparatus, comprising:
one or more processors; and logic encoded in one or more tangible media for execution by the one or more processors, and when executed is operable to: receive, at a routing engine, an incoming call from a gateway in communication with a public switched telephone network (PSTN), wherein the received incoming call comprises a calling number, a called number, and a caller identification; access a mapping of called numbers to individual user labels for uniquely identifying destination telephony users in the IP telephony network from a database maintained at the routing engine, the user labels comprising: a call prefix for identifying unique destination routing engines within the IP telephony network, a routing identification, distinct from the call prefix, for identifying sites hosted by each destination routing engine, and an extension identification, distinct from the call prefix and the routing identification, for identifying destination telephony users at each site; based on the mapping, translate the called number to a particular user label for identifying a destination telephony device in the IP telephony network determine that the call prefix of the particular user label matches a call prefix assigned to the routing engine; and identify a site hosted by the routing engine and having an assigned routing identification matching a routing identification of the particular user label; and transfer the incoming call from the routing engine to the site hosted by the routing engine and having the same routing identification as the routing identification of the particular user label, wherein the user label comprises a form of AA.XXX.EC.YYYY.

13. The apparatus of claim 12, wherein the user label is further used for identifying a line function.

14. The apparatus of claim 12, wherein the user label further comprises a call type code between the media tag and the enterprise code, the call type code indicating at least one of: forwarding the incoming call to a specific location, transferring the incoming call to voice mail, a priority of the incoming call, and whether the incoming call includes both voice and video.

15. The apparatus of claim 12, wherein the user label further comprises an enterprise code, wherein the enterprise code is separated from each of the media tag and the extension identification by period characters to designate hierarchy.

16. The apparatus of claim 15, wherein the logic to transfer the incoming call from the routing engine to the site hosted by the routing engine and having the same routing identification as the routing identification of the particular user label is further operable to transfer the incoming call to a destination telephone device associated with an enterprise at the site, wherein the routing engine determines the enterprise associated with the destination telephone device and located at the site based on the enterprise code, and the destination device for the incoming call using the extension identification.

17. The apparatus of claim 12, wherein the routing engine is directly connected to the gateway.

18. The apparatus of claim 12, wherein the user label includes an enterprise code for identifying particular enterprises at a common site and which is distinct from the call prefix, the routing identification and the extension identification, and
wherein the user label comprises a form of AA.XXX.EC.YYYY, wherein:
AA indicates the call prefix,
XXX indicates the routing identification,
EC indicates the enterprise code, and
YYYY indicates the extension identification.

* * * * *